United States Patent
Jones et al.

(10) Patent No.: US 11,906,645 B2
(45) Date of Patent: *Feb. 20, 2024

(54) CERTIFIED LOCATION FOR MOBILE DEVICES

(71) Applicant: Skyhook Wireless, Inc., San Diego, CA (US)

(72) Inventors: Russel Jones, Marietta, GA (US); Christopher Steger, Boston, MA (US); Nicolas Brachet, Newton, MA (US); Farshid Alizadeh-Shabdiz, Wayland, MA (US); Andrew Broadstone, Watertown, MA (US); Joel Morrin, North Reading, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,602

(22) Filed: Sep. 15, 2022

(65) Prior Publication Data

US 2023/0009243 A1      Jan. 12, 2023

Related U.S. Application Data

(63) Continuation of application No. 17/119,721, filed on Dec. 11, 2020, now Pat. No. 11,474,190, which is a
(Continued)

(51) Int. Cl.
*H04W 24/00*       (2009.01)
*G01S 5/02*        (2010.01)

(52) U.S. Cl.
CPC ............. *G01S 5/0231* (2013.01); *G01S 5/02* (2013.01); *G01S 5/0244* (2020.05)

(58) Field of Classification Search
CPC .......... G01S 5/0231; G01S 5/0244; G01S 5/02
See application file for complete search history.

(56) References Cited

U.S. PATENT DOCUMENTS

| 5,659,617 A | 8/1997 | Fischer |
| 7,151,939 B2 | 12/2006 | Sheynblat |
| (Continued) | | |

FOREIGN PATENT DOCUMENTS

| EP | 1301057 A1 | 4/2003 |
| EP | 1906199 A1 | 4/2008 |
| (Continued) | | |

OTHER PUBLICATIONS

International Preliminary Report on Patentability—PCT/US2015/017234, The International Bureau of WIPO—Geneva, Switzerland, dated Sep. 9, 2016.
(Continued)

*Primary Examiner* — Erika A Washington
(74) *Attorney, Agent, or Firm* — QUALCOMM Incorporated (57) ABSTRACT

In one example embodiment, a certified location service enables a mobile device to access a location-based service when a determined location meets a location requirement and an overall confidence score for the determined location exceeds a confidence threshold. A data package is received including identifiers of beacons observed by the mobile device, and a location of the mobile device is determined based on a calculated location of one or more of the beacons. An overall confidence score for the determined location is calculated based on one or more individual confidence scores for the one or more beacons used in determining the location or composite confidence scores for types of the one or more beacons. The determined location and the overall confidence score are provided to one or more provider (Continued)

servers that allow the mobile device to access a location-based service based thereon.

20 Claims, 6 Drawing Sheets

Related U.S. Application Data continuation of application No. 15/810,661, filed on Nov. 13, 2017, now Pat. No. 10,866,300, which is a continuation of application No. 14/629,987, filed on Feb. 24, 2015, now Pat. No. 9,817,101.

(60) Provisional application No. 61/943,697, filed on Feb. 24, 2014.

(56) References Cited

U.S. PATENT DOCUMENTS

| | | | |
|---|---|---|---|
| 7,551,579 | B2 | 6/2009 | Alizadeh-Shabdiz et al. |
| 8,618,984 | B2 | 12/2013 | Lin et al. |
| 8,619,643 | B2 | 12/2013 | Alizadeh-Shabdiz et al. |
| 8,638,256 | B2 | 1/2014 | Alizadeh-Shabdiz et al. |
| 8,638,725 | B2 | 1/2014 | Alizadeh-Shabdiz |
| 9,798,010 | B2 | 10/2017 | Fischer et al. |
| 9,817,101 | B2 | 11/2017 | Jones et al. |
| 10,866,300 | B2 | 12/2020 | Jones et al. |
| 11,474,190 | B2 * | 10/2022 | Jones ................. G01S 5/02 |
| 2002/0004399 | A1 | 1/2002 | McDonnell et al. |
| 2006/0240840 | A1 | 10/2006 | Morgan et al. |
| 2008/0045232 | A1 | 2/2008 | Cone |
| 2008/0227465 | A1 | 9/2008 | Wachter et al. |
| 2008/0281687 | A1 | 11/2008 | Hurwitz et al. |
| 2009/0100260 | A1 | 4/2009 | Govindarajan |
| 2011/0205125 | A1 | 8/2011 | Lin et al. |
| 2013/0029685 | A1 | 1/2013 | Moshfeghi |
| 2013/0045759 | A1 | 2/2013 | Smith |
| 2013/0117572 | A1 | 5/2013 | Berczes et al. |
| 2013/0288714 | A1 | 10/2013 | Lipman et al. |
| 2013/0340095 | A1 | 12/2013 | Broadstone et al. |
| 2013/0342401 | A1 | 12/2013 | Lin et al. |
| 2014/0080510 | A1 | 3/2014 | Morgan et al. |
| 2014/0179270 | A1 | 6/2014 | Anand |
| 2014/0187169 | A1 | 7/2014 | Alizadeh-Shabdiz et al. |
| 2014/0287778 | A1 | 9/2014 | Jones et al. |
| 2014/0308919 | A1 | 10/2014 | Baranov |
| 2015/0215762 | A1 * | 7/2015 | Edge ................. H04W 8/005 370/338 |
| 2015/0237595 | A1 | 8/2015 | Le Grand et al. |
| 2015/0241548 | A1 | 8/2015 | Jones et al. |
| 2018/0067185 | A1 | 3/2018 | Jones et al. |
| 2021/0132179 | A1 | 5/2021 | Jones et al. |

FOREIGN PATENT DOCUMENTS

| | | |
|---|---|---|
| EP | 2327995 A2 | 6/2011 |
| WO | 03007542 A1 | 1/2003 |
| WO | 2006110181 | 10/2006 |
| WO | 2007056738 A2 | 5/2007 |
| WO | 2013117966 A1 | 8/2013 |

OTHER PUBLICATIONS

International Search Report and Written Opinion—PCT/US2015/017234—ISA/EPO—dated Jun. 8, 2015.

\* cited by examiner

CERTIFIED LOCATION FOR MOBILE DEVICES

RELATED APPLICATIONS

The present application is a continuation of U.S. patent application Ser. No. 17/119,721, filed on Dec. 11, 2020, by Russel K. Jones et al., titled "Certified Location for Mobile Devices" now issued as U.S. Pat. No. 11,474,190, which is itself a continuation of U.S. patent application Ser. No. 15/810,661, filed on Nov. 13, 2017 by Russel K. Jones et al., titled "Certified Location for Mobile Devices" now issued as U.S. Pat. No. 10,866,300, which is itself a continuation of U.S. patent application Ser. No. 14/629,987, filed on Feb. 24, 2015 by Russel K. Jones et al., titled "Certified Location for Mobile Devices", now issued as U.S. Pat. No. 9,817,101, which claims priority to U.S. Provisional Patent Application No. 61/943,697, filed on Feb. 24, 2014 by Russel Jones et al., titled "Certified Location for Mobile Devices", the contents of all of which are incorporated by reference herein in their entirety.

BACKGROUND

Technical Field

The present disclosure relates generally to location-based services, and more specifically to accessing location-based services, for example, location-dependent content.

Background Information

Location-based services are a field of mobile applications that leverage the ability of many mobile devices to determine their current location, and deliver services based on this location. The services may involve accessing location-dependent content, such as location-dependent functionality of an application, location-dependent streaming media, location-dependent data files, etc. For example, based on the location of the mobile device, a user may be allowed to play, or prevented from playing, a game, may be allowed to view, or prevented from viewing, a certain video stream, may be allowed to access, or prevented from accessing, certain data files, etc. In addition to accessing location-dependent content, location-based services may take other forms. For example, location-based services may involve providing location information to other devices, collecting location-based statistical information, or a wide variety of other types of operations.

Often, location-based services, and in particular location-dependent content, is not particularly sensitive in nature. While accurate location information may be desirable, the occasional use an incorrect location (for example, due to use of unreliable location indicia or intentional falsification of information (i.e. spoofing)) may be tolerated.

However, in other cases, location-based services may be more sensitive. In such cases, the occasional use an incorrect location may be unacceptable. Location-based services, and in particular location-dependent content, may be sensitive for any of a variety of reasons. One reason may be the need to comply with contract obligations or government regulations. For example, certain sporting events (e.g., National Football League (NFL) games) are contractually subject to blackout rules that dictate that a video broadcast of the event cannot be shown within a certain geographic area (e.g., 75 miles of the stadium) unless certain conditions are met (e.g., the stadium was sold out). Similarly, certain states (e.g., New Jersey and Nevada) allow online gambling subject to restrictions that online gambling activities are limited to within the geographic borders of the state. The use of incorrect locations may lead to violations of these sorts of obligations and regulations. Another reason may relate to security policies designed to minimize potential theft or improper use of confidential information. For example, a company may allow access to confidential corporate files from devices located within a certain distance of their corporate headquarters, but may attempt to prevent, or place other restrictions upon, access from far flung locations. The use of incorrect locations may be an unacceptable vulnerability under such security policies.

Previous location determination techniques for mobile devices have generally focused upon improving the average accuracy of the determined location, and have generally tolerated the occasional return of incorrect locations. While some existing location determination techniques may return an expected error, such an expected error generally just indicates the usual accuracy of the location determination method; it is not specific to a particular determined location and its likelihood of being correct. Further, such expected error generally does not account for, nor prevent, intentional location spoofing.

Accordingly, there is a needed for improved techniques for determining a location of a mobile device, which may be used with location-based services, and more specifically with accessing location-based services, for example, location-dependent content.

SUMMARY

In one example embodiment, a location determination technique determines both one or more locations of a mobile device and a confidence score for each determined location, which represents a likelihood that the mobile device is actually located at that determined location. A provider of location-based services, and more specifically of location-dependent content, may allow access to the location-based services only when a determined location meets location requirements and the related confidence score exceeds a confidence threshold that is based upon standards and requirements of the provider. The confidence score may be an overall confidence score that is determined from individual confidence scores associated with calculated locations of "beacons" used in determining the location of the mobile device.

More specifically, in one embodiment, a mobile device may send a request for one or more locations and a data package to location determination server(s) that operate a certified location service. The data package may indicate "beacons" observed by the mobile device, for example, observed Wi-Fi access points (APs), observed cell towers, an Internet Protocol (IP) address assigned to the mobile device, etc. The certified location service may determine a calculated location of each beacon, for example, by accessing information in a reference database, and may determine one or more locations of the mobile device based on the calculated locations of at least some of the beacons. The certified location service may then determine individual confidence scores for each of the beacons used in determining each location of the mobile device. The individual confidence scores may be based on, for example, a number of geospatially diverse observations of the beacon made by devices, a recency of those observations, and a size of an area in which the devices have observed the beacon. An overall confidence score for a location may be derived from a combination (e.g., a weighted average) of each of the individual confidence scores, as well as various indicia of potential location spoofing. The certified location service then returns an indication of the one or more determined locations of the mobile device and the overall confidence score of each determined location.

The indication of the one or more determined locations and overall confidence score of each location may be one or more encrypted locations and overall confidence scores. The mobile device may pass the encrypted locations and overall confidence scores to provider server(s) operating a location-based service, for example, a location-dependent content delivery service. The location-based service may decrypt and compare the information to requirements and thresholds. When the one or more determined locations meets location requirements, and the overall confidences score exceed a confidence threshold, the location-based service may allow the mobile device access.

Alternatively, the indication of one or more determined locations and overall confidence scores may be a unique digital claim check that can be exchanged for the determined locations. The mobile device may pass the claim check to the provider server(s) operating the location-based service. The location-based service may use the claim check to retrieve the one or more determined locations of the mobile device and overall confidence score for each location from the certified location service. The location-based service may compare the information to requirements and thresholds. When the one or more determined locations meet location requirements, and the related overall confidence scores exceed a confidence threshold, the location-based service may allow the mobile device access.

It should be understood that the example embodiments discussed in this Summary may include a variety of other features, including other features discussed below, and variations thereof. Further a variety of other embodiments may be utilized. This Summary is intended simply as a brief introduction to the reader, and does not imply that the specific features mentioned herein are all the features of the invention, or are essential features of the invention.

BRIEF DESCRIPTION OF THE DRAWINGS

The Detailed Description below refers to the accompanying drawings of example embodiments, of which.

DETAILED DESCRIPTION

Figure 1:
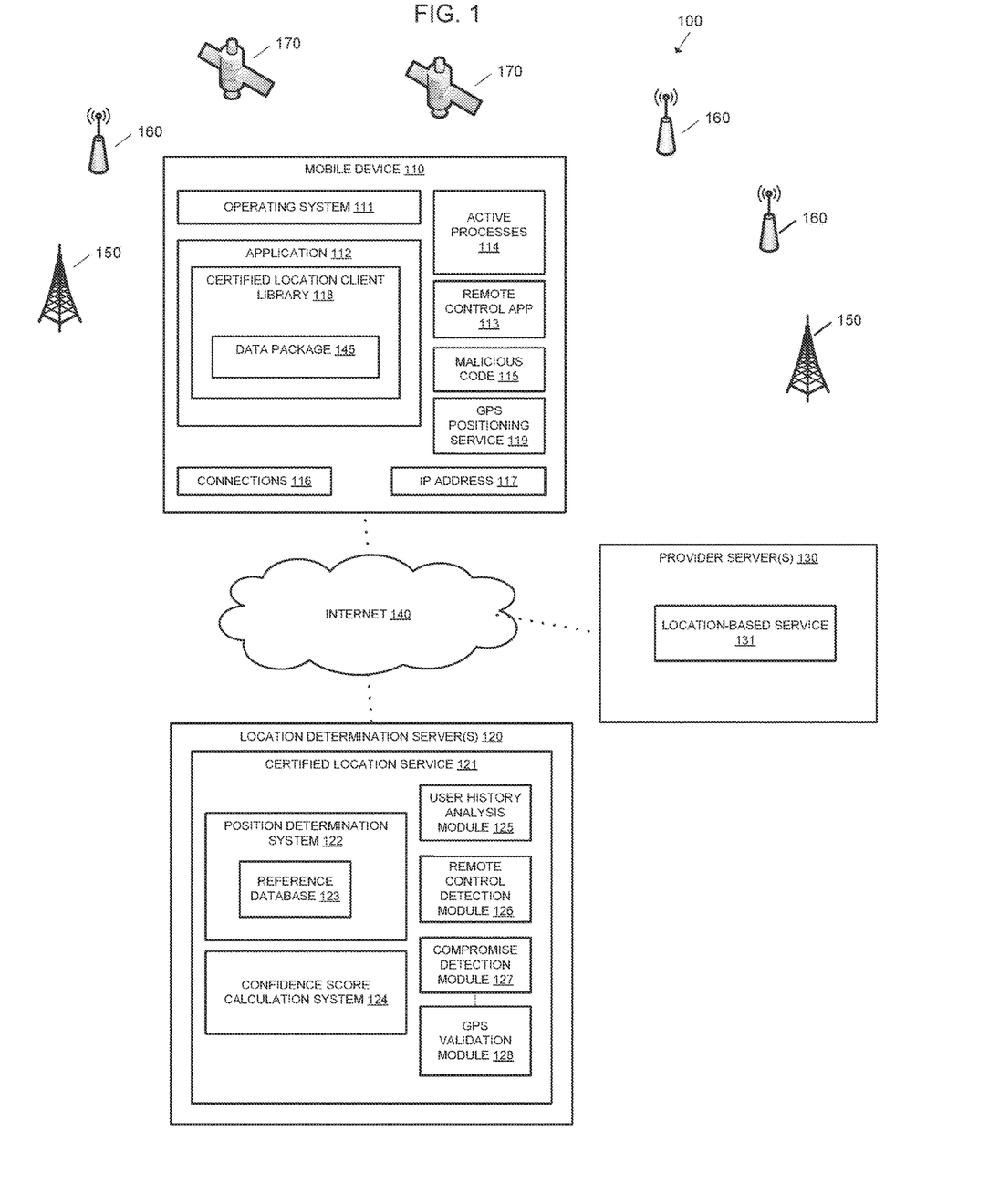
FIG. 1 is a block diagram of an example system that may implement a location determination technique that both determines one or more locations of a mobile device and a confidence score for each determined location.

FIG. 1 is a block diagram of an example system 100 that may implement a location determination technique that both determines one or more locations of a mobile device and a confidence score for each determined location. The system may include a mobile device 110, location determination server(s) 120, and provider server(s) 130. As used herein, the term "mobile device" refers to an electronic device designed to be carried on one's person or in a vehicle and having wireless communication capabilities. Examples of "mobile devices" include smartphones, tablet computers, electronic book readers, or other similar devices. The mobile device 110 may include a processor coupled to a memory, as well as one or more communication interfaces. The memory may store machine-executable instructions that include instructions for an operating system 111 and one or more applications. The operating system 111 may be an iOS® operating systems available from Apple Computer Inc., an Android® operating system available from Google Inc., a Windows® operating system available from Microsoft Inc., or another operating system that functionally organizes the mobile device 110. The applications may include an application 112 that accesses location-based services, or more specifically location-dependent content. The location-dependent content may be location-dependent functionality that is only enabled in certain locations, location-dependent streaming media that is only accessible in certain locations, location-dependent data files that are only accessible from certain locations, or other types of content. The location-dependent content may be provided from the provider server(s) 130.

In addition to the application 112, other types of applications may be loaded into the memory of the mobile device 110. In some cases, these applications may include a remote control application 113 (e.g., a remote desktop application) that allows a user to remotely manipulate the mobile device 110 as if they were locally using it. As explained below, an active remote control application 113 may be of interest to the present techniques.

In addition, other types of code may be present on the mobile device 110. This code may include various libraries, patches, toolkits, etc. As explained further below, one type of code of interest to the present techniques is malicious code 115 that allows a user to change parameters of the mobile device in an unauthorized manner. Malicious code 115 may be used to "jailbreak" a device executing an iOS® operating system or "root" a mobile device executing an Android® operating system.

The mobile device 110 may use its communications interfaces to observe (e.g., receive wireless signals from) various types of devices in its surrounding environment. For example, a Wi-Fi (e.g., an IEEE 802.11) interface may communicate with Wi-Fi access points (APs) 160 (e.g., via IEEE 802.11 wireless networking), a cellular network transceiver may receive signals from nearby cell towers 150, a global positioning system (GPS) receiver may receive GPS signals from GPS satellites 170, etc. As explained in more detail below, some of these received signals may be used in a position determination technique implemented on the location determination server(s) 120. Some of the signals may also be used locally on the mobile device 110 itself, for example, GPS signals may be used by a GPS positioning service 119 resident on the mobile device 110.

Via one or more of the communications interfaces, the mobile device 110 may establish a connection to the Internet 140. Communication over the Internet 140 may be supported by a network protocol stack implemented by the operating system 111 of the mobile device 110. For example, the operating system 111 may support a Transmission Control Protocol (TCP)/Internet Protocol (IP) stack, where each layer includes protocol processes that perform designated networking tasks. Among other processes, a TCP process may be responsible for establishing reliable end-to-end network connections 116 between the mobile device 110 and other devices. Likewise, a Dynamic Host Configuration Protocol (DHCP) client process may be responsible for obtaining an IP address 117 used by the mobile device 110.

In order to access location-based services, or more specifically, location-dependent content, the application 112 may utilize a certified location client library 118. The certified location client library 118 may be a portion of the application 112, or exist separately (e.g., as a shared library used by multiple applications). In operation, the certified location client library 118 may request one or more determined locations of the mobile device 110 and a confidence score for each determined location from location determination server(s) 120 accessible via the Internet 140.

To this end, the certified location client library 118 may assemble a data package 145 that is transmitted along with the request. In some implementations, the data package may be encrypted using an encryption algorithm, such as Data Encryption Standard (DES), Advanced Encryption Standard (AES) or another encryption algorithm. The data package 145 may include information descriptive of a plurality of "beacons" observed by the mobile device 110. As used herein the term "beacon" refers to a point of reference that has an individually calculated geographic location. Beacons may be devices observed by the communications interfaces of the mobile device 110, for example, the previously discussed Wi-Fi APs 160, cell towers 150, etc. Further, beacons may be unique identifiers associated with the mobile device 110, such as the IP address 116 assigned to the mobile device 110 or to an intermediary device (e.g., a gateway router) used to access the mobile device 110, which have an individually calculated geographic location (e.g., in the case of an IP address, a geographic location calculated via IP geo-location). The data package 145 may also include indicia of potential location spoofing activity. These indicia may include a list of the active processes 114 on the mobile device, an indication that malicious code 116 is present on the mobile device, an indication of certain types of open connections 116 on the mobile device, an identification of certain installed tools on the mobile device, a list of checksum values of system files on the mobile device, GPS ephemeris information for observed GPS satellites from the mobile device, and potentially other information descriptive of activity on the mobile device.

The request and data package are received by location determination server(s) 120, which each include at least a processor coupled to a memory that stores machine-executable instructions. The machine executable instructions may include instructions for a certified location service 121 that determines one or more locations of the mobile device 110 and a confidence score for each determined location, in response to the request and the data package 145. A position determination system 122 of the certified location service 121 may be responsible for the location determination task. In one implementation, the position determination system 122 is a hybrid position determination system that utilizes information descriptive of a plurality of different types of beacons (e.g., Wi-Fi APs, cell towers, IP addresses) observed by the mobile device 110. The position determination system 122 may compare the identities (e.g., indicated by media access control (MAC) address, cell tower ID, IP address, etc.) of observed beacons with those in the reference database 123.

The reference database 123 may maintain entries for beacons that include a location of the beacon calculated from a series of observations made by devices (e.g., other device executing a location client) and characteristics for the beacons derived from the observations. The characteristics may include a number of the observations (e.g., or geospatially diverse ones of the observations), a recency of those observations, and a size of an area from which the devices observed the beacon. The characteristics may also include, in some cases, a power profile generated from a collection of measurements of signal power, or signal time of arrival (TOA), at various locations about the beacon, as well as other types of information. The position determination system 122 may select a set of "best" observed beacons, based on a geographical distribution of the observed beacons and characteristics of the observed beacons. The calculated locations of the set of best observed beacons, along with the characteristics of these beacons, may then be used to calculate a relative location of the mobile device 110 (e.g., with respect to the beacons) using multilateration and/or other algorithms. Using the calculated locations of the beacons and the relative location, one or more absolute locations (e.g., in the form of latitude and longitude, or latitude, longitude, and altitude) may be calculated and then returned as one or more determined locations of the mobile device 110.

A confidence score for each determined location may be determined by a confidence score calculation system 124 of the certified location service 121. The confidence score for a determined location of the mobile device 110 represents a likelihood that the mobile device 110 is actually located at the determined location, as opposed to at some other location (e.g., due to inaccuracies in the calculated locations of beacons used as location indicia, intentional location spoofing, etc.). In one implementation, the confidence score for a determined location of the mobile device is an overall confidence score that is based on a combination (e.g., a weighted average) of individual confidence scores for each of the beacons used in the location determination of that location, as well as indicia of potential location spoofing activity. Each individual confidence score represents a likelihood that a beacon is actually located at the calculated location indicated in the reference database 123. The likelihood that the beacon is located at the calculated location may be based on the number of geospatially diverse observations of the beacon made by devices, the recency of those observations, and the size of an area in which the devices have observed the beacon. In general, the greater the number of the observations, the more recent the observations, and the smaller the area, the higher (i.e. more confident) the individual confidence score.

Figure 2:
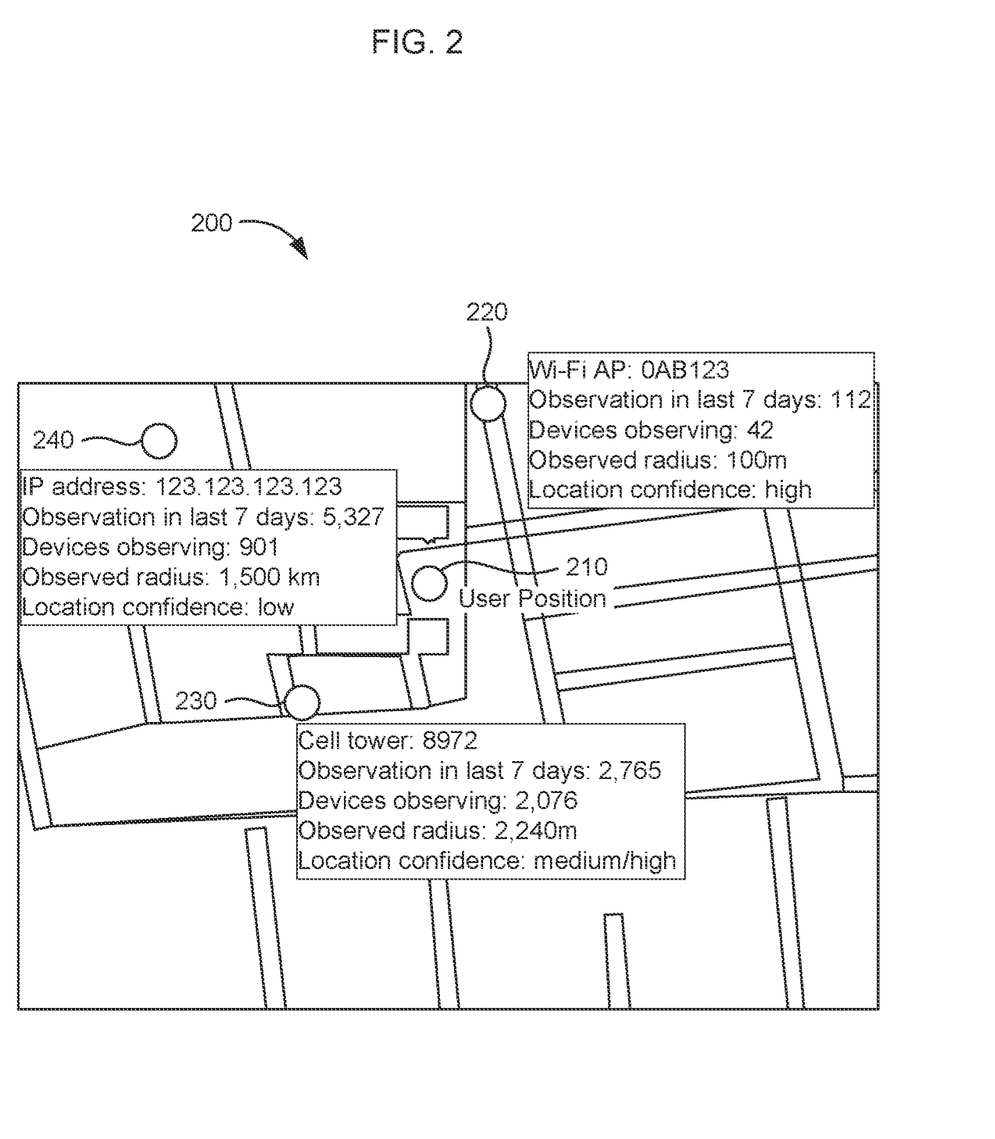
FIG. 2 illustrates an example of determining an overall confidence score for a location of a mobile device.

FIG. 2 illustrates an example of determining an overall confidence score for a location of a mobile device 110. A mobile device may be located at a location 210, and observe a plurality of beacons, such as Wi-Fi AP 220, cell tower 230, and IP address 240. Where devices have made a "large" number of geospatially diverse observations of a beacon from a "small" area over a recent period of time, a high individual confidence score is attributed to the calculated location of that beacon. Likewise, where devices have made a "small" number of geospatially diverse observations of a beacon, the observations span a "large" area, or have not occurred recently, a low individual confidence score is attributed to that beacon. The number of geospatially diverse observations considered to be "large" or "small", the size areas considered "large" or "small", and the period of time being considered "recent" may vary by the type of the beacon, being based on beacon type's range, general usage pattern, expected level of variation, etc.

Returning to FIG. 1, in addition to the individual beacon confidence scores, an overall confidence score may be based on indicia of potential location spoofing activity. A user history analysis module 125 may evaluate whether a determined location of the mobile device 110 is consistent with a history of locations of the mobile device maintained by the module 125, and, if not, trigger the confidence score calculation system 124 to decrease an overall confidence score. For example, should an impossible movement be detected by comparison of the determined location to locations in the history (e.g., moving between different continents in seconds), an overall confidence score may be substantially decreased.

A remote control detection module 126 may evaluate whether a user is likely physically present at the mobile device 110, or the mobile device is likely being remotely controlled. For example, the remote control detection module 126 may compare the list of the active processes 114 contained in the data package 145 with a list of known remote control (e.g., remote desktop) processes, may compare the indications of open connections 116 in the data package to known remote control services, and/or may utilize other information in the data package 145 to detect programmatic elements (e.g., identifiers in memory, file, resources, etc.) of known remote control services, or communication patterns that are consistent with remote control activity. Upon detecting that a remote control application is likely active, the remote control detection module 126 may trigger the confidence score calculation system 124 to substantially decrease an overall confidence score.

A compromise detection module 127 may evaluate whether malicious code 115 is present on the mobile device 110 (e.g., related to "jailbreaking" or "rooting"). For example, the compromise detection module 127 may utilize information in the data package 145 to determine if any tools employed by common system hacks are installed on the mobile device 110, or if checksum values of system files on the mobile device 110 differ (e.g., due to unauthorized modification) from known valid values. Upon detection of malicious code 115, the compromise detection module 127 may trigger the confidence score calculation system 124 to substantially decrease an overall confidence score.

Further, a GPS validation module 128 may evaluate whether GPS satellites observed from the mobile device 110 are consistent with satellites that should be in view for the determined location of the mobile device. In one implementation, the GPS validation module 128 may access publically available ephemeris for GPS satellites, that may include, among other information, an almanac that consists of coarse orbit and status information for each satellite. The GPS validation module 128 may compare the observed GPS satellites indicated in the data package 145 with a list of satellites that could possibly be in view, and check for consistency. If there is an inconsistency, for example an observed GPS satellite is located on the other side of the planet from a determined location, the GPS validation module 128 may trigger the confidence score calculation system 124 to substantially decrease an overall confidence score. In another implementation, the GPS validation module 128 may maintain a GPS location history of the device, which records GPS location over time. The GPS validation module 128 may examine the GPS location history and look for changes in location. Since many GPS location spoofing techniques may set the returned location to a constant set of values, a lack of change to the GPS location over a given period of time may be interpreted as a strong indication of ongoing spoofing, and the GPS validation module 128 may trigger the confidence score calculation system 124 to substantially decrease an overall confidence score.

The certified location service 121 on the location determination server(s) may return an indication of the one or more determined locations and overall confidence scores to the mobile device 110. This indication may be provided to the provider server(s) 130 and the location-based service 131 executing thereon. When the one or more determined locations meet location requirements, and the overall confidence scores for the determined locations exceed a confidence threshold that is based on the standards and requirements of the provider (e.g., a degree of confidence believed sufficient by the provider), the location-based service 131 may allow the mobile device 110 access.

In one implementation, the indication of the one or more determined locations and overall confidence scores is encrypted locations and overall confidence scores, encrypted by the certified location service 121 using an encryption algorithm, such as DES, AES or another encryption algorithm. The mobile device 110 may lack the key necessary to decrypt the information, and may simply pass it along to provider server(s) 130.

Figure 3:
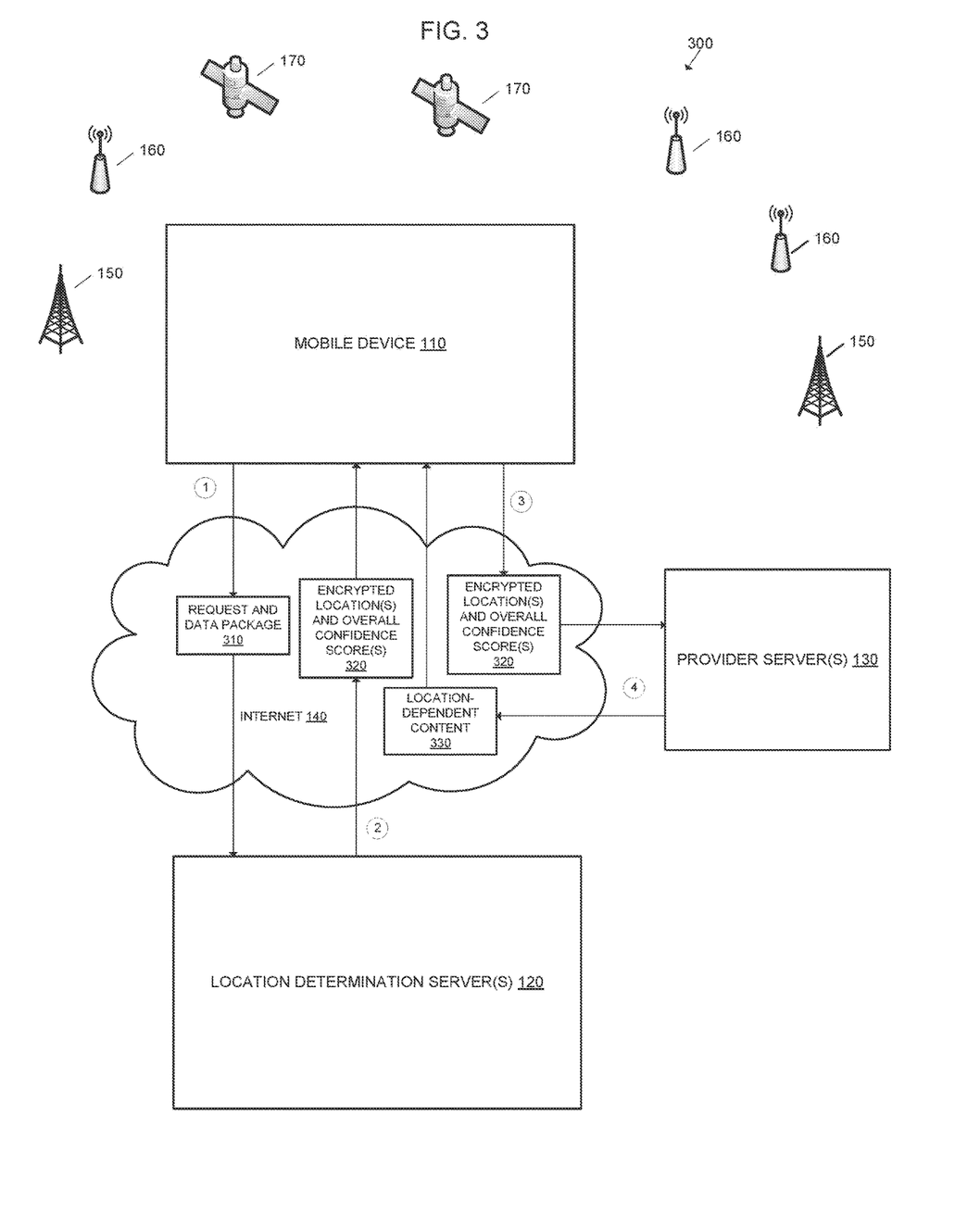
FIG. 3 is a simplified version of the example system of FIG. 1, illustrating message exchanges in an embodiment that returns one or more encrypted locations and overall confidence scores.

FIG. 3 is a simplified version 300 of the example system of FIG. 1, illustrating message exchanges in an embodiment that returns one or more encrypted locations and overall confidence scores. Certain details of FIG. 1, such as the internal processes on the mobile device 110, location determination server(s) 120 and the provider server(s) have been omitted for clarity. Circled numerals indicate one possible ordering of the operations. Initially, the mobile device 110 sends a request for one or more locations and a data package (collectively 310) to the location determination server(s) 120. The location determination server(s) 120 returns one or more encrypted locations and overall confidence scores 320. The mobile device 110, without decrypting the information, supplies the one or more encrypted locations and overall confidence scores 320 to the provider server(s) 130, which decrypt and evaluate them. When the one or more determined locations meet location requirements, and the overall confidence scores exceed a confidence threshold, location-based services, for example, location-dependent content 330, is provided to the mobile device 110.

In another implementation, the indication of one or more determined locations and overall confidence scores is a unique digital claim check (e.g., a code, certificate or other type of digital marker) that may be exchanged for the one or more determined locations of the mobile device and the overall confidence scores. The digital claim check is returned to the mobile device 110 which may then provide it to the provider server(s) 130.

Figure 4:
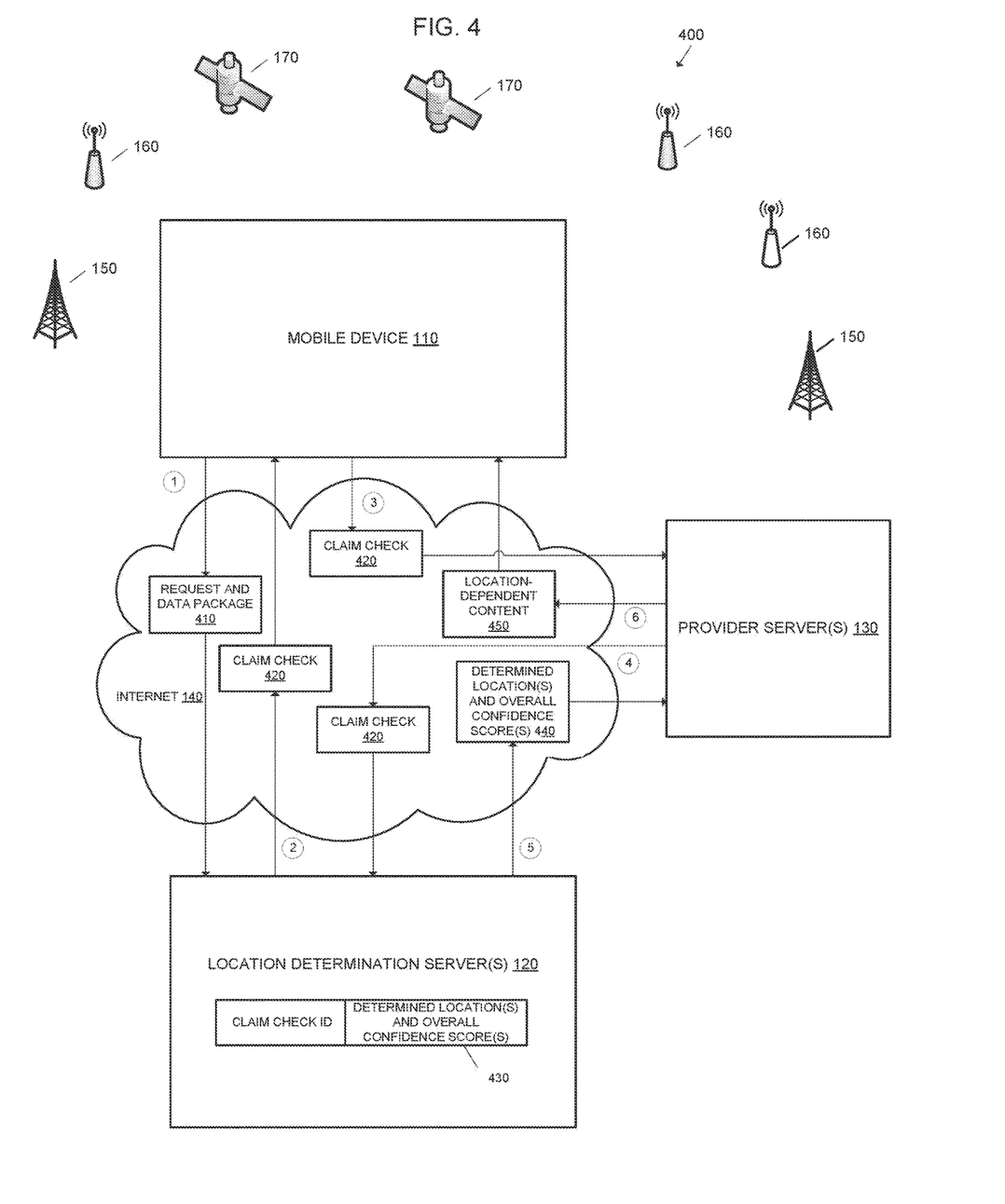
FIG. 4 is a simplified version of the example system of FIG. 1, illustrating message exchanges in an embodiment that returns a digital claim check.

FIG. 4 is a simplified version 400 of the example system of FIG. 1, illustrating message exchanges in an embodiment that returns a digital claim check. Certain details of FIG. 1 have been omitted for clarity. Circled numerals indicate one possible ordering of the operations. Initially, the mobile device 110 sends a request for one or more locations and a data package (collectively 410) to the location determination server(s) 120. The location determination server(s) 120 returns a unique digital claim check 420. The location determination server(s), or more specifically the location-based service thereon, also stores a database entry(s) 430 including one or more determined locations of the mobile device and related overall confidence scores indexed by an identifier of the associated digital claim check. The mobile device 110 supplies the digital claim check 420 to the provider server(s) 130. The provider server(s) then forward the digital claim check 420 to the location determination server(s), which use it to look up the one or more determined locations and overall confidence scores for the mobile device 110 by accessing the database entry(s) 430. The location determination server(s) return the one or more determined locations and overall confidence scores 440 to the provider servers 130. When the one or more determined locations meet location requirements, and the overall confidence scores exceed a confidence threshold, the provider server(s) 130 may allow the mobile device 110 access, for example, to location-dependent content.

Figure 5:
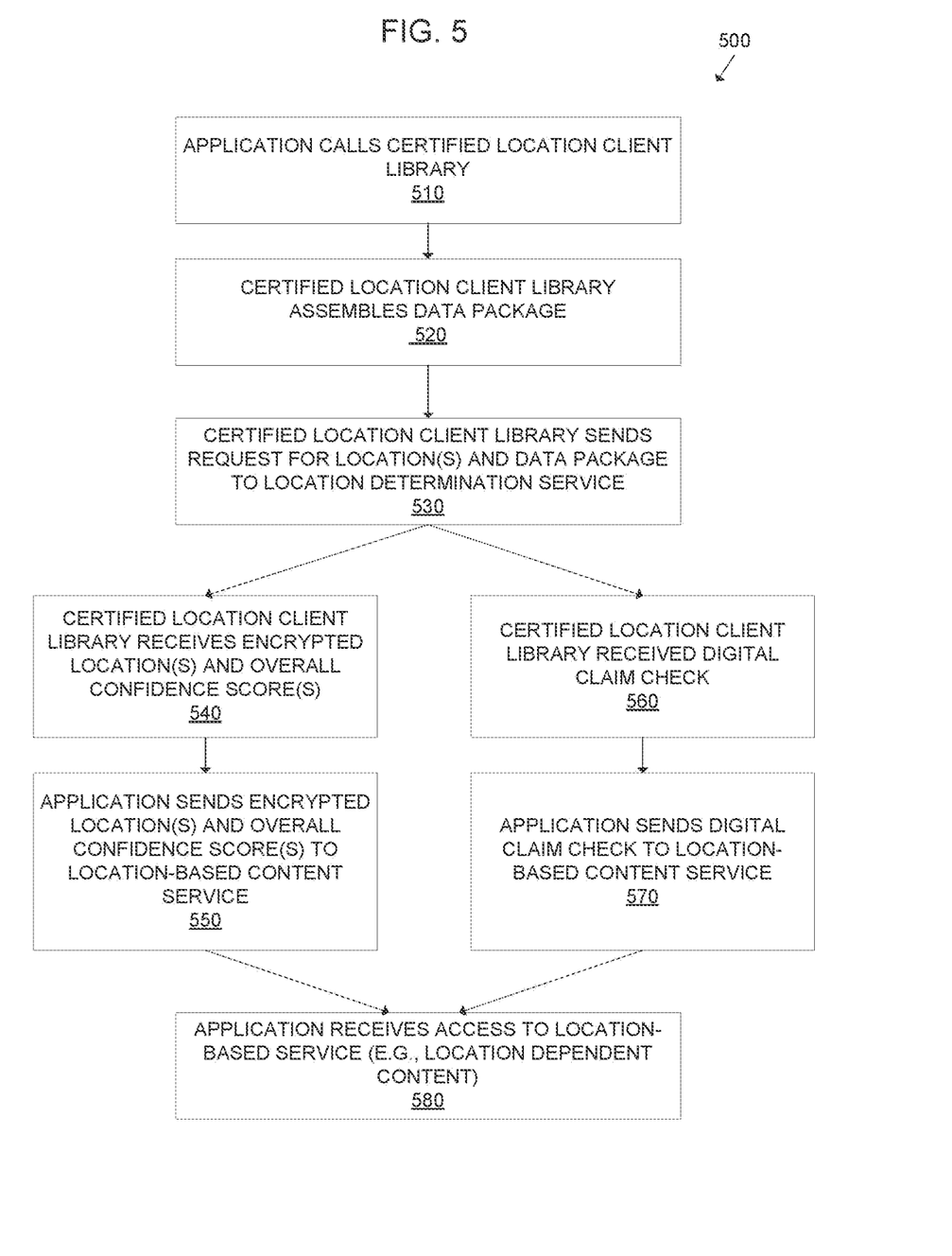
FIG. 5 is a flow diagram of an example sequence of steps that may be implemented on the mobile device.

FIG. 5 is a flow diagram of a sequence of steps 500 that may be implemented on the mobile device 110. Such diagram may summarize mobile device-side aspects of the operations discussed above. At step 510, the application 112 on the mobile device 110 calls the certified location client library 118 for one or more locations used with a location-based service, for example, to access location-dependent content. At step 520, the certified location client library 118 assembles a data package 145 that includes information descriptive of a plurality of beacons (e.g., Wi-Fi APs, cell towers, IP addresses, etc.) observed by the mobile device 110. At step 530, the certified location client library 118 sends a request for one or more locations and the data package to the certified location service 121 on the location determination server(s) 120. In an implementation that uses encryption, at step of 540, the certified location client library 118 receives back one or more encrypted locations and overall confidence scores. At step 550, the application 112 that sends the one or more encrypted locations and overall confidence scores to the location-based service operating on the provider server(s) 130. In an implementation that uses a unique digital claim check, at step 560, the certified location client library 118 receives back the claim check. At step 570, the application 112 sends the claim check to the location-based service 131 operating on the provider server(s) 130. Finally, at step 580, when the one or more determined locations and the confidence scores meet requirements, the application 112 receives access to location-based services, for example, allowing location-based content to be accessed and displayed on the mobile device 110.

Figure 6:
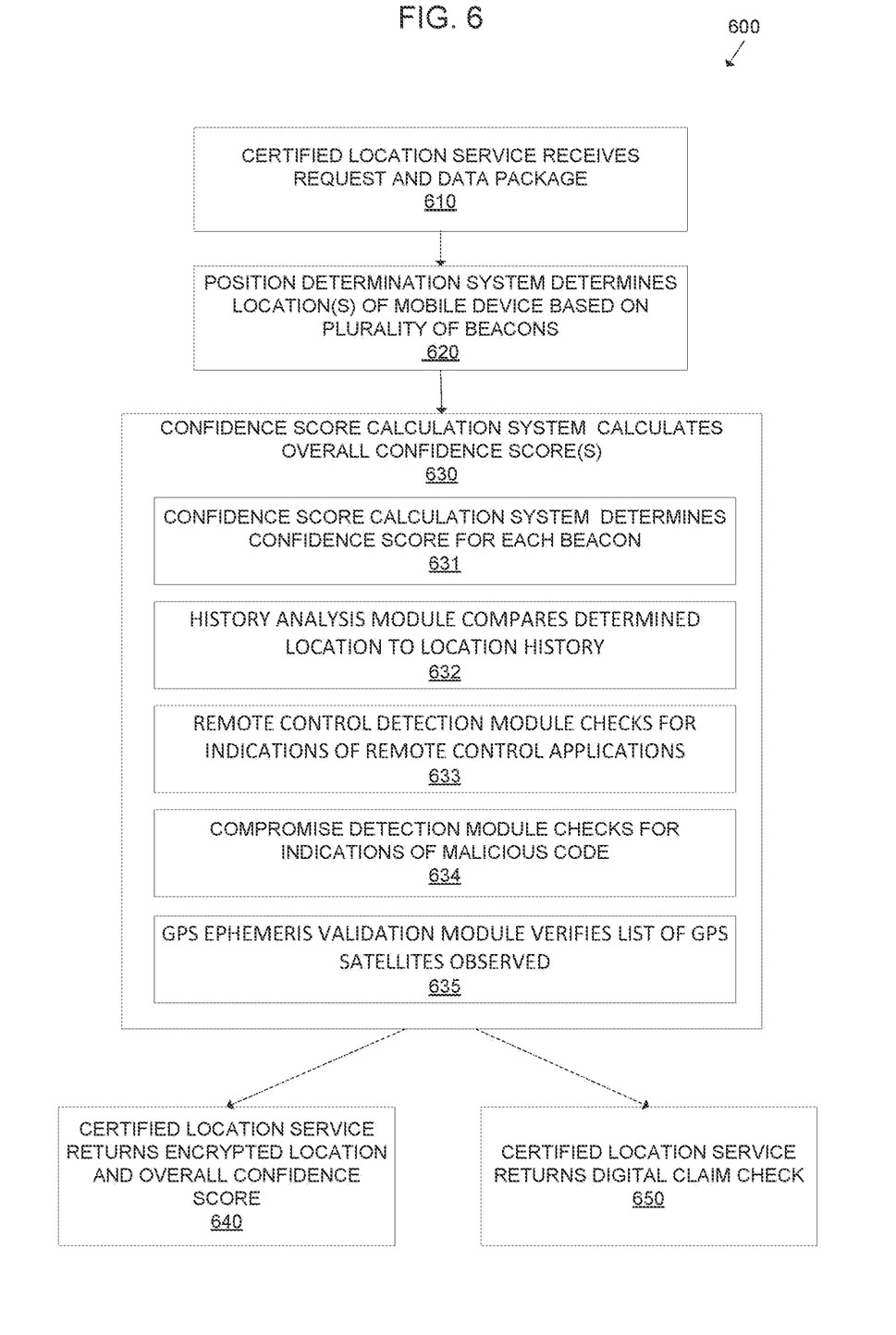
FIG. 6 is a flow diagram of an example sequence of steps that may be implemented on the location determination server(s).

FIG. 6 is a flow diagram of a sequence of steps 600 that may be implemented on the location determination server(s) 120. Such diagram may summarize server-side aspects of the operations discussed above. At step 610, the certified location service 121 on the location determination server(s) 120 receives a request for one or more locations of a mobile device and a data package 145. At step 620, the position determination system 122 of the certified location service 121 determines one or more locations of the mobile device based on a plurality of beacons (e.g., Wi-Fi APs, cell towers, IP addresses, etc.) observed by the mobile device, learned from the information contained in the data package 145. At step 630, the confidence score calculation system 124 calculates an overall confidence score for each determined location.

As discussed above, each overall confidence score may be based on a combination (e.g., a weighted average) of a plurality of individual confidence scores, as well as indicia of potential location spoofing activity. To that end, at sub-step 631, the confidence score calculation system 124 may determine individual confidence scores for the calculated locations of beacons used in determining the location of the mobile device 110. At sub-step 632, the user history analysis module 125 may compare of the related determined location of the mobile device 110 to a history of previously determined locations of the mobile device, and check for consistency. At sub-step 633, the remote control detection module 126 may check for indications of any remote control applications active on the mobile device 110. At sub-step 634, the compromise detection module may check for indications of any malicious code (e.g., "jailbreaking" or "rooting" software) present on the mobile device. Likewise, at sub-step 635, the GPS validation module may verify that a list of GPS satellites observed by the mobile device is consistent with those possibly in view from the determined location.

In an implementation that uses encryption, at step 640, the certified location service 121 on the location determination server(s) 120 returns one or more encrypted determined locations and related overall confidence scores to the mobile device 110, which may be passed to, and decrypted, at the provider server(s) 130. In an implementation that uses a unique digital claim check, at step 650, the certified location service 121 on the location determination server(s) 120 returns an digital claim check to the mobile device 121, which may be passed to and redeemed by the provider server(s) 130.

In summary, the above described techniques may be used to determine one or more locations of a mobile device, and calculate a confidence score for each determined location that represents a likelihood that the mobile device is actually located at that determined location, taking into account inaccuracies in location indicia and potential location spoofing. It should be understood that the techniques and portions thereof may be utilized together, individually, or in combination with other techniques, depending on the implementation. Further, it should be understood that aspects of the techniques may be modified, added to, removed, or otherwise changed depending on the implementation.

For example, while the above examples involve determining one or more locations and related confidence scores for a mobile device 110, such as a smartphone or tablet computer, it should be understood that many of the techniques are readily applicable to determining a location and confidence score for other types of electronic devices. For example, many of the techniques may be used with larger electronic devices, that may still be moved about, but that may take more effort, for example, laptop computers, desktop computers, networking equipment, etc.

Further, while the above examples involve a mobile device 110 that is capable of observing a plurality of different types of beacons, it should be understood that the techniques may also be applicable to an electronic device that is capable of observing only one type of beacon (e.g., only Wi-Fi access points, only cell towers, etc.)

Further, while it is discussed above that an overall confidence score is based on a combination of individual confidence scores for each of the beacons used in the location determination of the related location, the overall confidence score may alternatively be based on one or more composite confidences scores for the types of beacons used. A composite confidence score may be a confidence score based on the collective properties of all the beacons of a given type, or a filtered set of the beacons of a given type, rather than on just the properties of an individual beacon. The composite confidence score may be used as the confidence score for any beacon of the given type, rather than an individualized value.

Further, while various applications and services are described as resident on the mobile device 110, the location determination server(s) 120, and the provider server(s) 130, it should be understood that the applications and services, and portions thereof, may be otherwise located, such that operations may be performed on different devices arranged in different configurations. Operations described as being performed on separate devices may be performed on the same device, while operations described as being performed on one device may be split among multiple devices.

Finally, while specific example hardware and software is discussed above, it should be understood that the technique may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory computer-readable medium, such as a volatile or persistent memory device, a hard-disk, or other data store. Combinations of software and hardware may be adapted to suit different environments and applications.

Accordingly, it should be understood that the above descriptions are meant to be taken only by way of example.

What is claimed is:

1. A method, comprising:
  receiving, at one or more location determination servers, a data package from a mobile device including identifiers of one or more beacons observed by the mobile device, the one or more beacons including at least an observed Wi-Fi access point (AP), an observed cell tower, or an Internet Protocol (IP) address assigned to the mobile device, the data package also including location information for the mobile device;
  calculating, at the one or more location determination servers, a determined location of the mobile device based on at least one of the one or more beacons observed by the mobile device;
  calculating, at the one or more location determination servers, an overall confidence score for the determined location based on consistency of the determined location and the location information for the mobile device; and
  providing an indication that allows the mobile device to access a location-based service only when the determined location meets a location requirement and the overall confidence score for the determined location exceeds a confidence threshold, providing the determined location to the location-based service, or a combination thereof.

2. The method of claim 1, wherein the location information for the mobile device comprises location information that was calculated by the mobile device.

3. The method of claim 1, wherein the location information for the mobile device includes a reported location of the mobile device, and consistency of the determined location of the mobile device is determined at least in part by comparing the reported location of the mobile device to the determined location for the mobile device.

4. The method of claim 3, further comprising reducing the overall confidence score when the reported location of the mobile device is not possible in view of the determined location of the mobile device.

5. The method of claim 1, wherein the one or more location determination servers maintain a location history of the mobile device that records a location of the mobile device over time, and wherein consistency of the determined location and the location information for the mobile device is determined at least in part by detecting whether the location of the mobile device has changed over time.

6. The method of claim 5, further comprising reducing the overall confidence score when no change in location of the mobile device over time is detected or when a change in location of the mobile device over time is impossible.

7. The method of claim 1, wherein the calculating the overall confidence score for the determined location comprises basing the overall confidence score on one or more individual confidence scores for the one or more beacons used in calculating the determined location.

8. The method of claim 1, wherein the calculating the overall confidence score for the determined location comprises basing the overall confidence score on one or more composite confidence scores for types of the one or more beacons used in calculating the determined location.

9. The method of claim 1, wherein the providing the indication includes transmitting the determined location and the overall confidence score to one or more provider servers without passing through the mobile device.

10. The method of claim 1, wherein the providing the indication includes transmitting a digital claim check to the mobile device, wherein the digital claim check is exchangeable for the determined location and the overall confidence score.

11. An apparatus, comprising:
  a memory; and
  at least one processor communicatively coupled to the memory, the at least one processor configured to:
  receive, at one or more location determination servers, a data package from a mobile device including identifiers of one or more beacons observed by the mobile device, the one or more beacons including at least an observed Wi-Fi access point (AP), an observed cell tower, or an Internet Protocol (IP) address assigned to the mobile device, the data package also including location information for the mobile device;
  calculate, at the one or more location determination servers, a determined location of the mobile device based on at least one of the one or more beacons observed by the mobile device;
  calculate, at the one or more location determination servers, an overall confidence score for the determined location based on a consistency of the determined location and the location information for the mobile device; and
  provide an indication that allows the mobile device to access a location-based service only when the determined location meets a location requirement and the overall confidence score for the determined location exceeds a confidence threshold, provide the determined location to the location-based service, or a combination thereof.

12. The apparatus of claim 11, wherein the location information for the mobile device comprises location information that was calculated by the mobile device.

13. The apparatus of claim 11, wherein the location information for the mobile device includes a reported location of the mobile device, and wherein the at least one processor is further configured to determine the consistency of the determined location of the mobile device at least in part by comparing the reported location of the mobile device to the determined location for the mobile device.

14. The apparatus of claim 13, wherein the at least one processor is further configured to reduce the overall confidence score when the reported location of the mobile device is not possible in view of the determined location of the mobile device.

15. The apparatus of claim 11, wherein the one or more location determination servers maintain a location history of the mobile device that records a location of the mobile device over time, and wherein the at least one processor is further configured to determine the consistency of the determined location of the mobile device at least in part by detecting whether the location of the mobile device has changed over time.

16. The apparatus of claim 15, wherein the at least one processor is further configured to reduce the overall confidence score when no change in location of the mobile device over time is detected or when a change in location of the mobile device over time is impossible.

17. The apparatus of claim 11, wherein the at least one processor is configured to calculate the overall confidence score for the determined location based on the overall confidence score on one or more individual confidence scores for the one or more beacons used in calculating the determined location.

18. The apparatus of claim 11, wherein the at least on processor is configured to calculate the overall confidence score for the determined location based on the overall confidence score on one or more composite confidence scores for types of the one or more beacons used in calculating the determined location.

19. The apparatus of claim 11, wherein the at least one processor is configured to provide the indication by transmitting the determined location and the overall confidence score to one or more provider servers without passing through the mobile device.

20. The apparatus of claim 11, wherein the at least one processor is configured to provide the indication by transmitting a digital claim check to the mobile device, wherein the digital claim check is exchangeable for the determined location and the overall confidence score.

* * * * *